United States Patent [19]

Hoffmann et al.

[11] Patent Number: 4,988,474
[45] Date of Patent: Jan. 29, 1991

[54] PROCESS AND HOLDING COMPONENT FOR REPAIR OF A NUCLEAR FUEL ASSEMBLY DAMAGED AT THE PERIPHERY OF A SPACER SUPPORT

[75] Inventors: Heinz Hoffmann, Einhausen; Leonhard Knierriem, Erbach; Franz Pötz, Heppenheim, all of Fed. Rep. of Germany

[73] Assignee: ABB Reaktor GmbH, Fed. Rep. of Germany

[21] Appl. No.: 373,353

[22] Filed: Jun. 28, 1989

[30] Foreign Application Priority Data

Jun. 28, 1988 [DE] Fed. Rep. of Germany ....... 3821666

[51] Int. Cl.$^5$ .............................................. G21C 19/00
[52] U.S. Cl. ..................................... 376/261; 376/446
[58] Field of Search ............... 376/261, 260, 446, 463; 29/402.08, 426.4, 426.3, 723, 906, 402.12, 402.11; 414/146

[56] References Cited

U.S. PATENT DOCUMENTS 4,784,825 11/1988 Busselman et al. ................. 376/446
4,857,262 8/1989 Spilker ................................ 376/261

FOREIGN PATENT DOCUMENTS 2627006 8/1989 France ................................ 376/261

*Primary Examiner*—Daniel D. Wasil
*Attorney, Agent, or Firm*—Robert J. Edwards; D. Neil LaHaye

[57] ABSTRACT

Process and holding component for repair of a nuclear reactor fuel assembly spacer support. The holding component is formed from a metal strip, on the free ends of which are introduced elastic projections. After removal of the damaged crosspiece, a holding component partly embracing the fuel rod is locked into a slot of a spacer support by means of its projections.

9 Claims, 4 Drawing Sheets

FIG.1
FIG.2
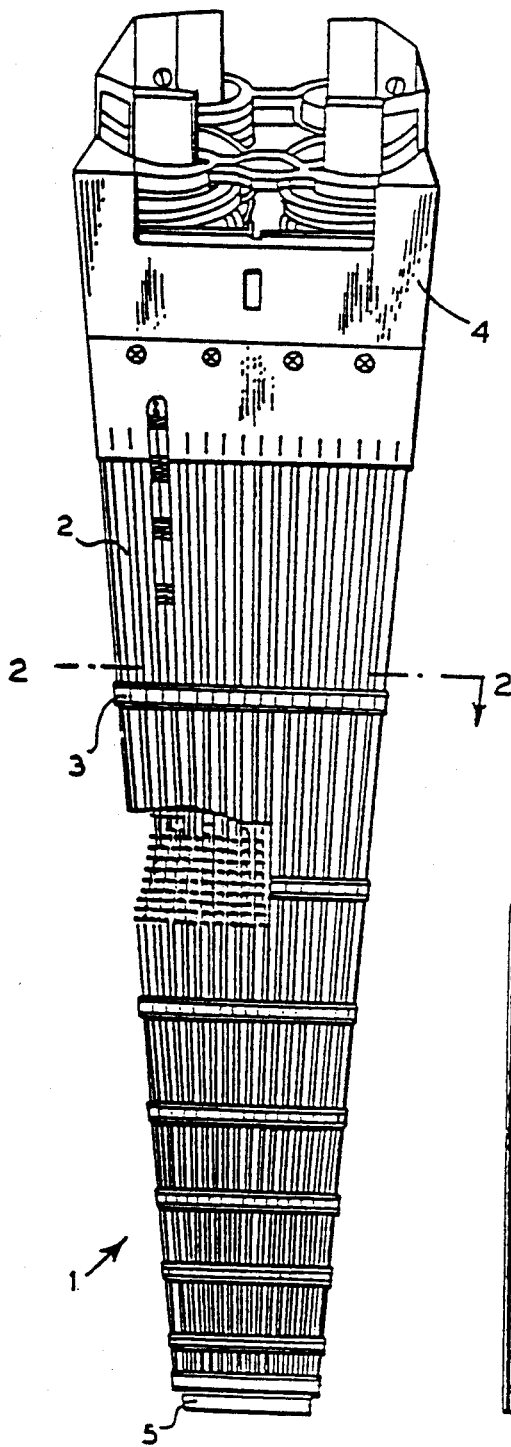
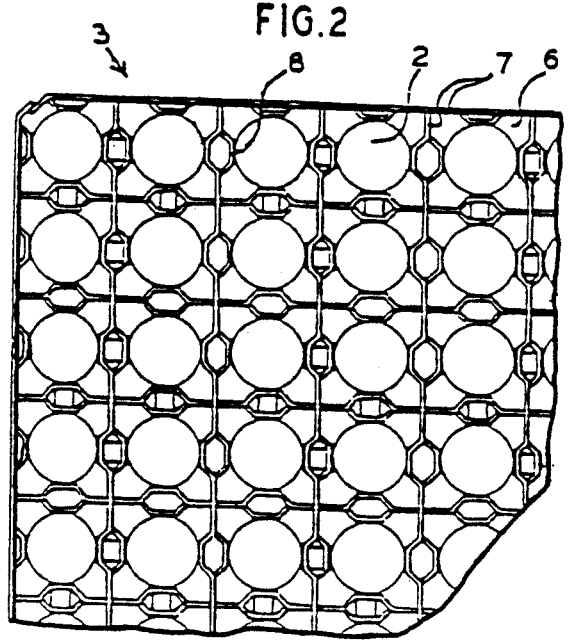

PROCESS AND HOLDING COMPONENT FOR REPAIR OF A NUCLEAR FUEL ASSEMBLY DAMAGED AT THE PERIPHERY OF A SPACER SUPPORT

BACKGROUND OF THE INVENTION

The invention concerns a process for repair of a nuclear reactor fuel assembly damaged at the periphery of a spacer support, which assembly consists of a bundle of longitudinally extended fuel rods, which are held in position by several grid-shaped interim spacer supports that are axially separated from one another, whereby each fuel rod passes through a cell of the spacer support formed by intersecting metal crosspieces arranged at the edge and is supported therein elastically.

During loading or unloading of a reactor core with fuel assemblies, peripheral spacer support cells are occasionally damaged by catching against neighboring fuel assemblies.

In order to eliminate such damage in the prior art, a fuel rod or a dummy fuel rod was re-inserted in position after removing or straightening the damaged metal crosspieces of the spacer support. In particular, if two or more spacer supports arranged one above the other are damaged and the metal crosspieces must be completely removed, the insufficient support leads to a swinging of the fuel road and thus this rod or the neighboring fuel rod can be easily damaged.

If one wishes to avoid such swinging, according to the state of the art, all rods of the fuel assembly must be withdrawn in a time consuming way, and then be inserted into a new fuel assembly frame consisting of the spacer support, guide and end pieces. In addition to loss of time here there is also the danger that the fuel rods will receive excessive cracks during withdrawal and reinsertion, and in addition, the spacer support may be damaged.

Therefore, the objective is to create a process of the type given above, but in which swinging can be avoided.

SUMMARY OF THE INVENTION

This objective is solved according to the invention by the fact that, after removing the damaged metal crosspieces, a holding component contacting the fuel rod is joined to the spacer support.

By this means, it is possible to attach the fuel rod relative to the spacer support, so that undesired swinging movements are avoided.

If a dummy fuel rod (dummy) is inserted into the cell instead of a fuel rod, then, in a preferred embodiment of the process, the holding component is inserted into a snap ring groove. In this way, any shifting of the holding component relative to the rod, which is beyond the play required for heat-expansion equilibration, is avoided.

The holding component for realization of the process is a metal strip partially embracing the circumference of the fuel rod or dummy fuel rod, which strip has a projection that can be joined to the spacer support on each of its free ends.

Thus the rod is held by simple means in a swingless manner in as precise a way as in an intact spacer support.

The projections on the free ends of the holding component are formed elastically, so that the rod can assuredly be axially displaced for purposes of a heat expansion equilibration in addition to offering a reliable installation of the rod on the remaining metal crosspieces of the spacer support.

A jut-out piece formed elastically and turned toward the rod supports this means and also assures a better contact of the fuel rod with the coolant.

If a corner cell is damaged, the projections preferably engage in slots of the two remaining pieces, whereas if a non-corner cell is damaged, three crosspieces remain, so that in that case, a direct hanging of the holding component on the crosspieces is preferably produced.

For insertion of a dummy fuel rod, a configuration of a holding component may be used which is characterized by the fact that the holding component is embodied in the form of a split pin (cotter) whose arms are formed elastically and on the free ends of which are found projections, whereby after passing through a borehole or a slot of the dummy fuel rod, the projections can engage in the spacer support.

This configuration crates a holding component which cannot fall off since passing through an opening, which may be a bore or a slot, produces a firm hold with the elastically loaded arms, which take on a larger diameter than the borehole behind the borehole, and in this way, it cannot fall out of the borehole as a result of an unintentional loosening of the locking device with the spacer support. An undesired rotation of the holding component in the cooling cycle of the nuclear reactor installation is thus not possible.

In order to simplify the mounting of a holding component in combination with a dummy fuel rod, a longitudinal groove is provided in the region of the snap ring groove of the dummy fuel rod in order to create a place for a mounting tool.

BRIEF DESCRIPTION OF THE DRAWINGS

Based on the examples of embodiment and the schematic drawings of FIGS. 1–13, examples of embodiment of the process of the invention and of the holding component for conducting the process will now be described.

FIG. 1 shows an overview of a fuel assembly;

FIG. 2 shows a section along line II—II of FIG. 1;

DETAILED DESCRIPTION OF THE PREFERRED EMBODIMENT

Figure 3:
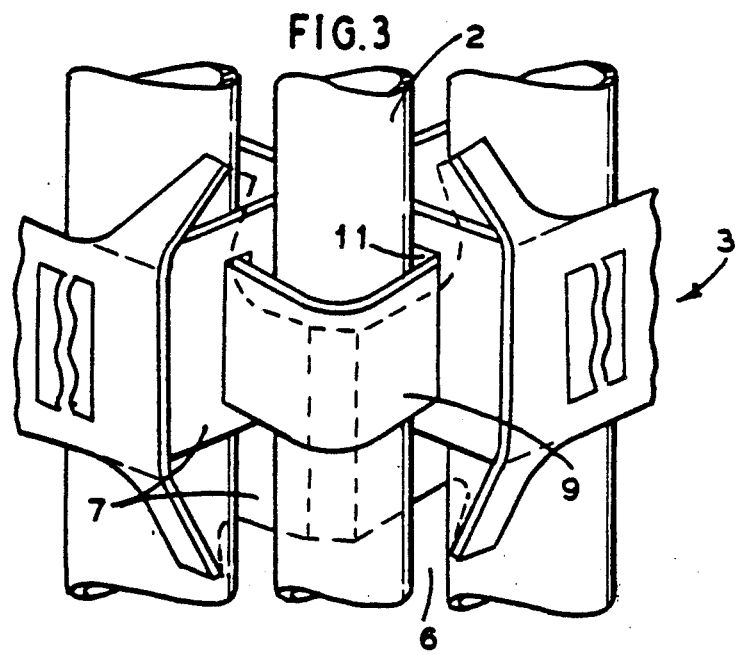
FIG. 3 shows a partial view of a spacer support in perspective representation with a fuel rod and a holding component.

FIG. 1 shows a nuclear reactor fuel assembly 1 in an overview. It consists of many fuel rods 2, which are held in their position by several interim spacer supports 3 which are axially separated. Upper and a lower fuel assembly tie plates 4, 5 are held together by guide tubes that are not shown. The guide tubes or an instrumentation tube, also not shown, carry the spacer supports and attach them at their axial interval.

As can be seen from FIG. 2, which shows a partial region of a spacer support on a larger scale, each fuel rod 2 passes through a cell 6, so that it is enclosed by four crosspieces 7 that form the cell, whose jut-out pieces 8 formed in part elastically contact fuel rod 2. If crosspieces lying at the periphery of the spacer support are damaged, then they are removed and their function is taken over by a holding component 9 described in more detail below.

The repair process and the respective holding component 9 can be recognized from FIG. 3. Cell 6 exists only as a cell carcass of a fuel rod 2 (corner rod) positioned on a corner of spacer support 3, after separation of the damaged piece 7 indicated by the dot-dash line. A holding component 9 has, as can also be seen in FIGS. 4-8, on each of its free ends an elastically formed projection 10, which engages in a slot 11 of a cross piece 7. The holding component 9 contacting a fuel rod 2 over a part of its circumference thus fixes the fuel rod and prevents an undesired swinging of this fuel rod. The elastic projections assure, on the one hand, a precise positioning of the rod, and, on the other hand, permit a vertical displacement of the fuel rod for equilibrating heat expansions and radiation-conditioned longitudinal changes.

Figure 4:
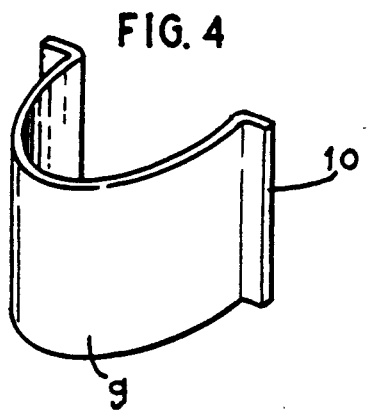
FIGS. 4–8 show different embodiments of a holding component.
Figure 5:
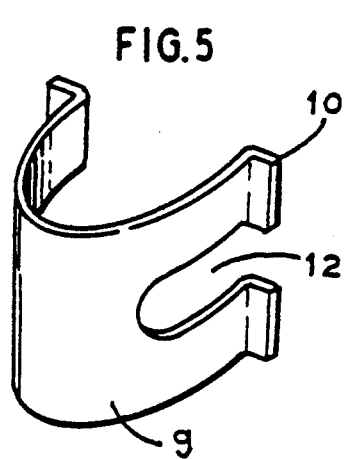
Figure 6:
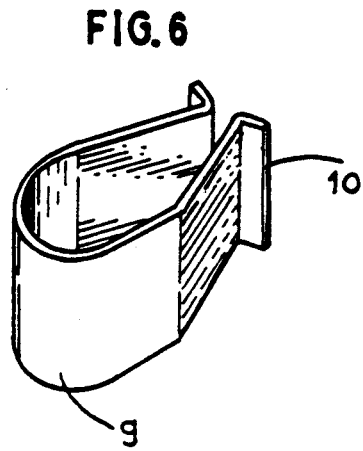
Figure 7:
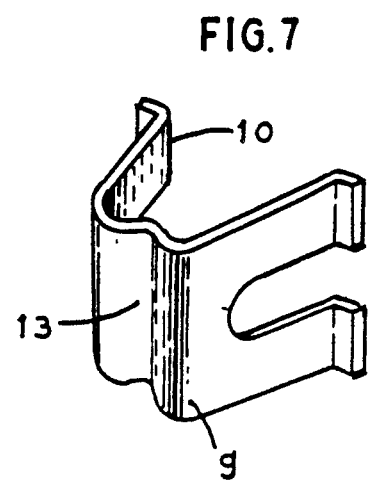
Figure 8:
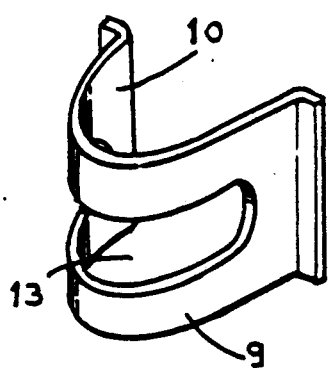

Several examples of embodiments of holding component 9 can be seen in FIGS. 4-8. All of the embodiments consist of a metal strip, which displays on its free ends formations of projection 10 engaged in a slot 11 of the crosspiece, which formations are adapted to the particular dimensions of the respective fuel rod. Whereas FIG. 4 shows a holding component consisting of a metal strip, a holding component can be seen from FIGS. 5 and 8, which is provided with a recess 12 for adapting to the elastic force. A jut-out piece 13 according to FIG. 7 which is formed elastically if necessary, reduces the contact surfaces between fuel rod 2 and holding component 9 and also simplifies the passage of the coolant between the fuel rod and the holding component. A holding component 9 with projections 10 according to FIG. 6 with slightly angled sides formed elastically simplifies the introduction of the holding component into grooves 11 of the cell carcass; in this case the latter are arranged at the intersecting points of two crosspieces 7. The metal strip for producing a holding component consists of a material (e.g. Inconel 718 or 750), which retains its spring properties even during irradiation.

Figure 11:
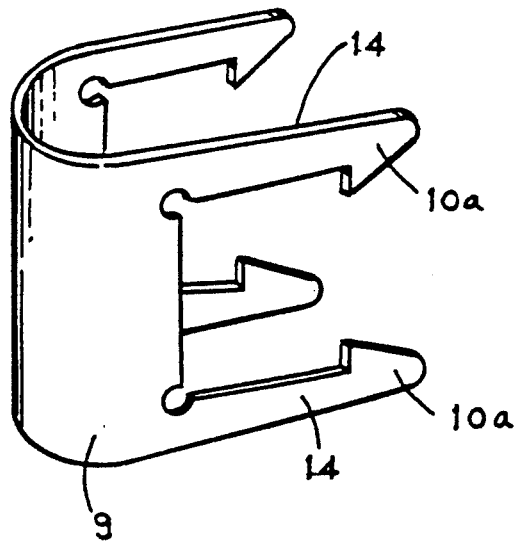
FIG. 11 shows a holding component for a "non-corner rod"
Figure 12:
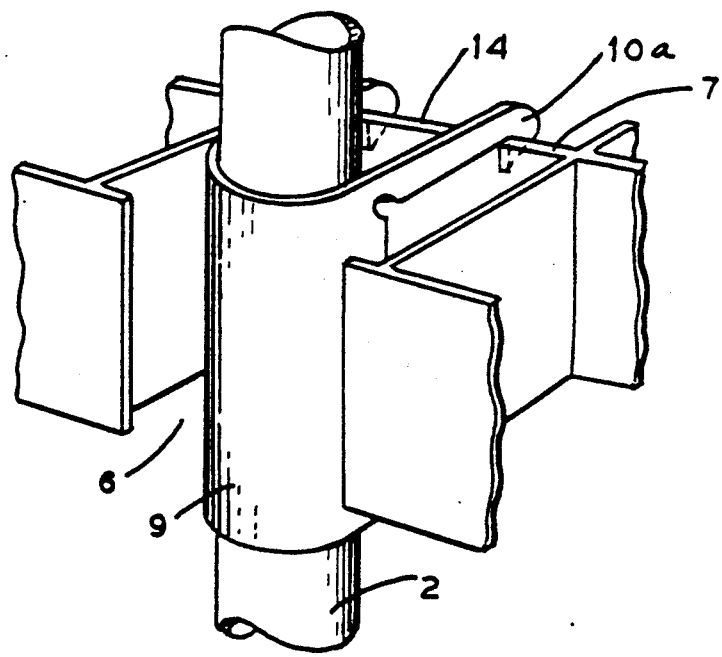
FIG. 12 shows a holding component for a "non-corner rod" in its inserted position.

An example of embodiments, which shows a holding component for a "non-corner rod" is described by FIGS. 11 and 12. After removing the peripheral crosspiece 7, a cell carcass with three crosspieces remains. The holding component 9 according to FIG. 11 consists of a sheet metal adapted to the contour of the fuel rod, of which upper and lower edges 14 extend hook-shaped projections 10a. They are also formed elastically and are set into crosspieces 7.

Figure 9:
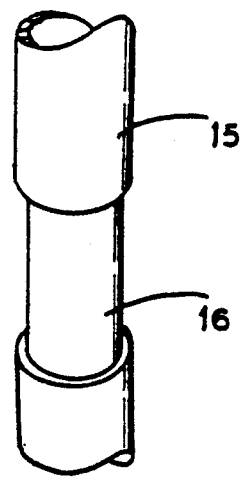
FIG. 9 shows a partial region of a dummy fuel rod.
Figure 10:
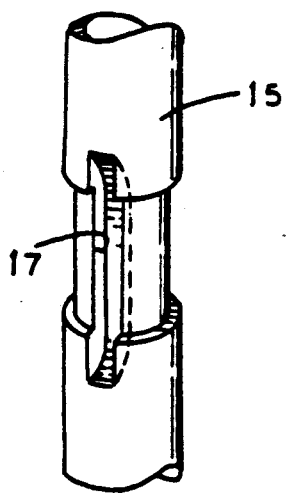
FIG. 10 shows another configuration of the dummy fuel rod.

The removal of the damaged crosspiece 7 of a cell 6 may be conducted with an installed fuel rod. However, it may also be necessary to dismantle the fuel rod and to replace it by a new fuel rod or a dummy fuel rod 15. The previously described holding components may be inserted for the dummy fuel rod. In order to secure the holding component against axial displacement, a dummy fuel rod 15 may display a snap ring groove 16 (FIG. 9) and/or also a longitudinal groove 17 (FIG. 10).

The snap ring groove 16 is thus adapted to the height of a holding component such that there is sufficient play for assuring the rod motion for equilibration of heat expansions. This form of embodiment has the advantage that no parts exist that project over the dummy fuel rod and that would offer an attack surface, e.g., for catching onto the adjacent fuel assembly. The axially running longitudinal groove 17 is then necessary if a mounting tool has parts projecting inside above the holding component.

Figure 13:
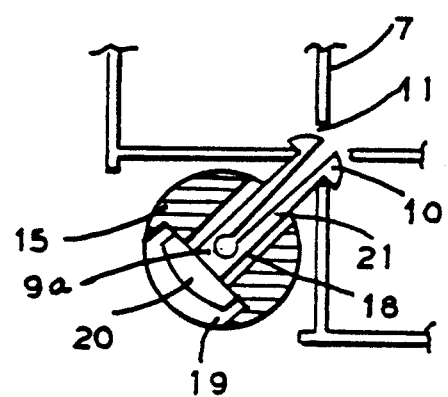
FIG. 13 shows a holding component for a dummy fuel rod.

Another form of embodiment directed in particular for use with a dummy fuel rod 15 is shown in FIG. 13. Accordingly, by running crosswise to the axis the dummy fuel rod 15 passes through borehole 18, which is provided with a depression 19. The holding component 9a is formed like a type of split pin. It has a head 20, from which extend two arms 21 formed elastically, which arms have projections 10 of the type shown in FIGS. 4-8 on their free ends, each of which extend from holding component 9. After passing through borehole 18, whereby projections 10 lie against the borehole wall, elastically, arms 21 spread apart again and engage with their projections 10 into slot 11 of crosspieces 7 of spacer support 3. The head 20 of holding component 9a thus comes to lie on the shoulder of depression 19, so that the fixed position of the dummy fuel rod 15 is produced.

What is claimed as invention is:

1. A method for repairing a nuclear reactor fuel assembly damaged at the periphery of an interim spacer support, the fuel assembly comprised of a bundle of longitudinally extended fuel rods held in position by several grid-shaped spacer supports axially distanced from one another whereby each fuel rod passes through and is elastically supported in a cell of the spacer support which is formed by intersecting metal crosspieces arranged at the edge, the method comprising:
   a. removing the damaged portion of a cell of a spacer support; and
   b. installing a holding component which contacts the fuel rod and is attached to a remaining portion of the cell.

2. The method of claim 1, wherein the holding component is provided with a projection on each of its free ends which engages in a slot in the metal crosspiece.

3. The method of claim 1, wherein the holding component is provided with at least one elastic projection that engages over the metal crosspiece.

4. The method of claim 1, wherein the holding component is provided with a jut-out piece directed toward the fuel rod.

5. The method of claim 4, wherein the jut-out piece provided is formed elastically.

6. A method for repairing a nuclear reactor fuel assembly damaged at the periphery of an interim spacer support, the fuel assembly comprised of a bundle of longitudinally extended fuel rods held in position by several grid-shaped spacer supports axially distanced from one another whereby each fuel rod passes through and is elastically supported in a cell of the spacer support which is formed by intersecting metal crosspieces arranged at the edge, the method comprising:
   a. removing the damaged portion of a cell of a spacer support; and
   b. installing a holding component which contacts the fuel rod and is attached to a remaining portion of the cell by an elastically formed projection on each of its free ends which engages in a slot in the metal crosspiece.

7. The method of claim 6, wherein the holding component is provided with a jut-out piece directed toward the fuel rod.

8. A method for repairing a nuclear reactor fuel assembly damaged at the periphery of an interim spacer support, the fuel assembly comprised of a bundle of longitudinally extended fuel rods held in position by several grid-shaped spacer supports axially distanced from one another whereby each fuel rod passes through and is elastically supported in a cell of the spacer support which is formed by intersecting metal crosspieces arranged at the edge, the method comprising:

a. removing the damaged portion of a cell of a spacer support;
b. replacing the fuel rod with a dummy fuel rod that does not contain nuclear fuel; and
c. installing a holding component which contacts the dummy fuel rod and is attached to a remaining portion of the cell.

9. The method of claim 8, wherein:
a. said dummy fuel rod is provided with a radial bore; and
b. said holding component is provided with projections in the form of a split pin that passes through the radial bore in said dummy fuel rod.

* * * * *